United States Patent
Sugita et al.

(10) Patent No.: US 8,212,983 B2
(45) Date of Patent: Jul. 3, 2012

(54) LIQUID CRYSTAL DISPLAY DEVICE

(75) Inventors: Tatsuhiko Sugita, Gyota (JP); Hiroshi Ogawa, Ooamishirasato (JP)

(73) Assignees: Hitachi Displays, Ltd., Chiba-Ken (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 440 days.

(21) Appl. No.: 12/153,067

(22) Filed: May 13, 2008

(65) Prior Publication Data
US 2008/0309865 A1    Dec. 18, 2008

(30) Foreign Application Priority Data
May 18, 2007    (JP) .................................. 2007-133118

(51) Int. Cl.
*G02F 1/1343*    (2006.01)
*G02F 1/133*    (2006.01)
(52) U.S. Cl. ............... 349/139; 349/19; 349/20; 349/21
(58) Field of Classification Search ............... 349/19–21, 349/139
See application file for complete search history.

(56) References Cited

U.S. PATENT DOCUMENTS
5,739,880 A * 4/1998 Suzuki et al. .................. 349/110
2006/0139501 A1* 6/2006 Lee et al. .......................... 349/21
2006/0290862 A1* 12/2006 Yanagawa et al. ............. 349/139

FOREIGN PATENT DOCUMENTS
| JP | 05-196951 | 8/1993 |
| JP | 07-153559 | 6/1995 |
| JP | 09-105918 | 4/1997 |
| JP | 2006-201575 | 8/2006 |

* cited by examiner

*Primary Examiner* — Brian M. Healy
*Assistant Examiner* — Mary El Shammaa
(74) *Attorney, Agent, or Firm* — Stites & Harbison, PLLC; Juan Carlos A. Marquez, Esq

(57) ABSTRACT

In a liquid crystal display panel, a liquid crystal layer is sandwiched between a TFT substrate and a color filter substrate. An ITO film is formed on a front surface of the color filter substrate. By supplying an electric current to the ITO film at the time of staring an operation of the liquid crystal display panel, a temperature of the liquid crystal layer is elevated to a level which allows the liquid crystal layer to perform a normal operation within a short time. By forming a plating electrode on two sides of the color filter substrate, it is possible to uniformly supply an electric current to the ITO film thus enabling uniform heating of the color filter substrate.

14 Claims, 16 Drawing Sheets

LIQUID CRYSTAL DISPLAY DEVICE

CROSS-REFERENCE TO RELATED APPLICATION

The present application claims priority from Japanese application JP2007-133118 filed on May 18, 2007, the content of which is hereby incorporated by reference into this application.

BACKGROUND OF THE INVENTION

1. Field of the Invention

The present invention relates to a liquid crystal display device, and more particularly to a technique which can shorten a time until the normal display appears from the time of starting the liquid crystal display device in a low-temperature environment.

2. Description of the Related Art

A liquid crystal display device has been popularly used in various fields such as a computer terminal, a television receiver set, a mobile phone or the like. Although various kinds of displays are used in automobile, the application of the liquid crystal display device has been also spreading to these fields. The display used for the automobile is necessary to withstand a broad temperature environment. When the temperature of liquid crystal is lowered, a response speed corresponding to an electric field is lowered. Accordingly, at the time of starting the automobile during a winter season, the inside of the automobile is at a low temperature and hence, there exists a drawback that a considerable time is necessary until the liquid crystal display device becomes warm and the normal operation is acquired.

To cope with such a drawback, a technique which mounts a heater on a liquid crystal display device thus shortening time until the liquid crystal display device becomes warm is disclosed in JP-A-7-153559 (patent document 1) or JP-A-2006-201575 (patent document 2), for example.

On the other hand, the liquid crystal display device has a drawback that a viewing angle is not sufficient. Even when the liquid crystal display device is applied to an automobile, a display is not always positioned right in front of a person who watches the display and hence, it is preferable that the viewing angle is as wide as possible. Among various liquid crystal display devices, an IPS (In Plane Switching) liquid crystal display device which adopts a lateral electric field driving method exhibits excellent viewing angle characteristic and hence, the IPS liquid crystal display device is suitable also as an automobile-use display. As document which discloses such an IPS liquid crystal display device, JP-A-9-105918 (patent document 3) is named.

In the technique disclosed in patent document 1, a heater is provided by forming an electrode on a conductive plastic sheet, and by supplying an electric current to the conductive plastic sheet. Then, the conductive plastic sheet is adhered to the liquid crystal display device so as to heat the liquid crystal display device under low temperature thus overcoming a drawback relating to the temperature environment. This technique is characterized by uniformly heating the liquid crystal display device.

However, in the technique disclosed in patent document 1, it is necessary to additionally mount the conductive plastic sheet as a separate part and hence, there arise drawbacks such as a rise of cost attributed to the increase of number of parts or the increase of a step for assembling the conductive plastic sheet in the liquid crystal display device. The response characteristic of the liquid crystal display panel requires the elevation of temperature of liquid crystal sandwiched between two glass plates to a temperature suitable for an operation of a liquid crystal layer. With respect to the technique disclosed in patent document 1, there exists a possibility that heat generated by the heater is not efficiently transmitted to the liquid crystal portion depending on a location where the conductive plastic sheet is mounted.

In the technique disclosed in patent document 2, a touch panel is mounted on a display screen of a liquid crystal display panel, a temperature of the touch panel is detected by a separately-mounted temperature sensor. When the temperature is low, electrodes of the touch panel are also used as a heater thus overcoming a drawback relating to a temperature environment. However, in the technique disclosed in patent document 2, the touch panel is firstly heated to elevate the temperature of the touch panel, and an operation of the touch panel has to be performed only after heat is transmitted to the liquid crystal display panel. Accordingly, there arises a drawback that it takes time to start the liquid crystal display device from the low-temperature environment.

SUMMARY OF THE INVENTION

The present invention have been made to overcome the above-mentioned. To describe typical means for overcoming such drawbacks, they are as follows.

A liquid crystal display device comprising a liquid crystal display panel which is constituted of a TFT substrate on which pixel electrodes and TFTs are formed, a color filter substrate on which color filters are formed, and liquid crystal sandwiched between the color filter substrate and the TFT substrate, wherein a transparent conductive film is formed on a front surface of the color filter substrate, an electrode for heating the color filter substrate by supplying an electric current to a transparent electrode is formed on one side and another side which faces the one side in an opposed manner of the color filter substrate, and lead members for supplying an electric current to the respective electrodes from the outside are formed on the respective electrodes.

A liquid crystal display device including a liquid crystal display panel which is constituted of a TFT substrate on which pixel electrodes and TFTs are formed, a color filter substrate on which color filters are formed, and liquid crystal sandwiched between the color filter substrate and the TFT substrate, wherein a flexible printed circuit board is connected to a front surface of the TFT substrate, a transparent conductive film is formed on a front surface of the color filter substrate, an electrode for heating the color filter substrate by supplying an electric current to a transparent electrode is formed on one side and another side which faces the one side in an opposed manner of the color filter substrate, and lead members for supplying an electric current to the respective electrodes from the outside are formed on the respective electrodes, and the lead member extends over a front surface of the TFT substrate, and the electrode is connected with a line of the flexible printed circuit board.

A liquid crystal display device housing a liquid crystal display panel which is constituted of a TFT substrate on which pixel electrodes and TFTs are formed, a color filter substrate on which color filters are formed, and liquid crystal sandwiched between the color filter substrate and the TFT substrate in the inside of a metal-made upper frame, wherein a transparent conductive film is formed on a front surface of the color filter substrate, an electrode for heating the color filter substrate by supplying an electric current to a transparent electrode is formed on one side and another side which faces the one side in an opposed manner of the color filter substrate, and a lead member for supplying an electric current to the electrode from the outside is formed on the electrode, and an insulation member is formed between the upper frame and the electrode or the lead member.

DESCRIPTION OF THE PREFERRED EMBODIMENTS

Figure 1:
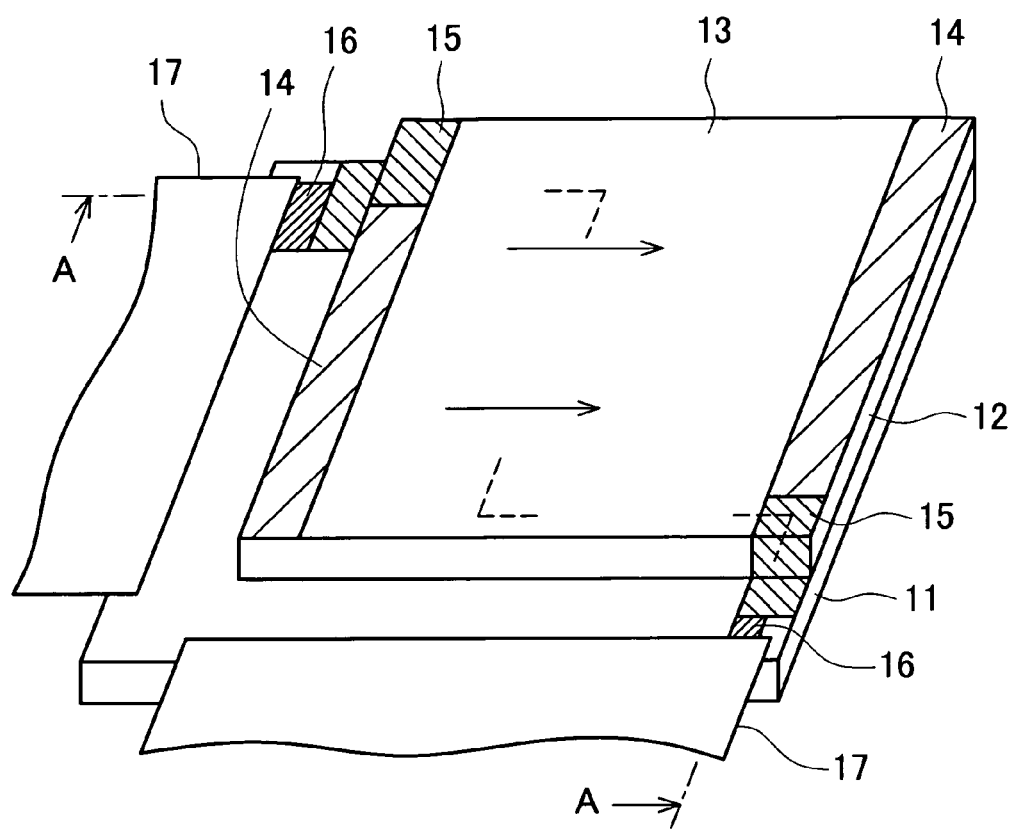
FIG. 1 is a perspective view of a liquid crystal display panel of a liquid crystal display device according to an embodiment 1.

The present invention have been made to overcome the above-mentioned drawback and it is an object of the present invention to provide a liquid crystal display device which can acquire a normal operation within a short time even in a low-temperature environment. To describe typical means for overcoming such drawbacks, they are as follows.

According to a first aspect of the present invention, there is provided a liquid crystal display device including a liquid crystal display panel which is constituted of a TFT substrate on which pixel electrodes and TFTs are formed, a color filter substrate on which color filters are formed, and liquid crystal sandwiched between the color filter substrate and the TFT substrate, wherein a transparent conductive film is formed on a front surface of the color filter substrate, an electrode for heating the color filter substrate by supplying an electric current to a transparent electrode is formed on one side and another side which faces the one side in an opposed manner of the color filter substrate, and lead members for supplying an electric current to the respective electrodes from the outside are formed on the respective electrodes.

According to a second aspect of the present invention, there is provided a liquid crystal display device including a liquid crystal display panel which is constituted of a TFT substrate on which pixel electrodes and TFTs are formed, a color filter substrate on which color filters are formed, and liquid crystal sandwiched between the color filter substrate and the TFT substrate, wherein a flexible printed circuit board is connected to a front surface of the TFT substrate, a transparent conductive film is formed on a front surface of the color filter substrate, an electrode for heating the color filter substrate by supplying an electric current to a transparent electrode is formed on one side and another side which faces the one side in an opposed manner of the color filter substrate, and lead members for supplying an electric current to the respective electrodes from the outside is formed on the respective electrodes, and the lead members extend over a front surface of the TFT substrate, and the electrodes are connected with lines of the flexible printed circuit board.

According to a third aspect of the present invention, there is provided a liquid crystal display device housing a liquid crystal display panel which is constituted of a TFT substrate on which pixel electrodes and TFTs are formed, a color filter substrate on which color filters are formed, and liquid crystal sandwiched between the color filter substrate and the TFT substrate in the inside of a metal-made upper frame, wherein a transparent conductive film is formed on a front surface of the color filter substrate, an electrode for heating the color filter substrate by supplying an electric current to a transparent electrode is formed on one side and another side which faces the one side in an opposed manner of the color filter substrate, and a lead member for supplying an electric current to the electrode from the outside is formed on the electrode, and an insulation member is formed between the upper frame and the electrode or the lead member.

According to a fourth aspect of the present invention, there is provided a liquid crystal display device including a liquid crystal display panel which is constituted of a TFT substrate on which pixel electrodes and TFTs are formed, a color filter substrate on which color filters are formed, and liquid crystal sandwiched between the color filter substrate and the TFT substrate, wherein a transparent conductive film is formed on a front surface of the color filter substrate, an electrode for heating the color filter substrate by supplying an electric current to a transparent electrode is formed on one side and another side which faces the one side in an opposed manner of the color filter substrate, and conductive tapes for supplying an electric current to the respective electrodes from the outside are formed on the respective electrodes, and the conductive tape covers a whole surface of the electrode.

According to a fifth aspect of the present invention, there is provided a liquid crystal display device including a liquid crystal display panel which is constituted of a TFT substrate on which pixel electrodes and TFTs are formed, a color filter substrate on which color filters are formed, and liquid crystal sandwiched between the color filter substrate and the TFT substrate, wherein a transparent conductive film is formed on a front surface of the color filter substrate, and a flexible printed circuit board is connected to one side and another side which faces the one side in an opposed manner of the color filter substrate by way of an anisotropic conductive film for heating the color filter substrate by supplying an electric current to a transparent conductive film.

According to the present invention, by adopting the above-mentioned constitutions, the color filter substrate of the liquid crystal display panel can be efficiently heated and hence, it is possible to considerably shorten the time until the liquid crystal display device can perform a normal operation even under a low-temperature environment.

Further, according to the present invention, the plated film is used as the electrode for supplying the electric current to the transparent conductive film and hence, it is possible to uniformly supply the electric current to the transparent conductive film whereby the whole color filter substrate of the liquid crystal display panel can be uniformly heated thus preventing display irregularities at the time of starting the liquid crystal display device.

Further, according to another aspect of the present invention, with the use of the conductive tape as the connection member for supplying the electric current to the transparent conductive film and the electrode of the conductive film from the pixel portion, the connection operation can be easily performed thus enabling the manufacture of liquid crystal display device in a compact shape with high reliability. According to still another aspect of the present invention, with the use of the flat cable via the solder as the connection member for supplying the electric current to the transparent conductive film and the electrode of the conductive film from the pixel portion, the connection resistance can be decreased thus enabling the safe supply of a large quantity of electric current.

According to still another aspect of the present invention, to supply the electric current to the transparent conductive film formed on the color filter substrate, the flexible printed circuit board for supplying a heater current is mounted on two sides of the color filter substrate by way of the anisotropic conductive film and hence, it is possible to supply a relatively large quantity of electric current required by a heater with high reliability.

The present invention is explained in detail in conjunction with embodiments.

[Embodiment 1]

Figure 2:
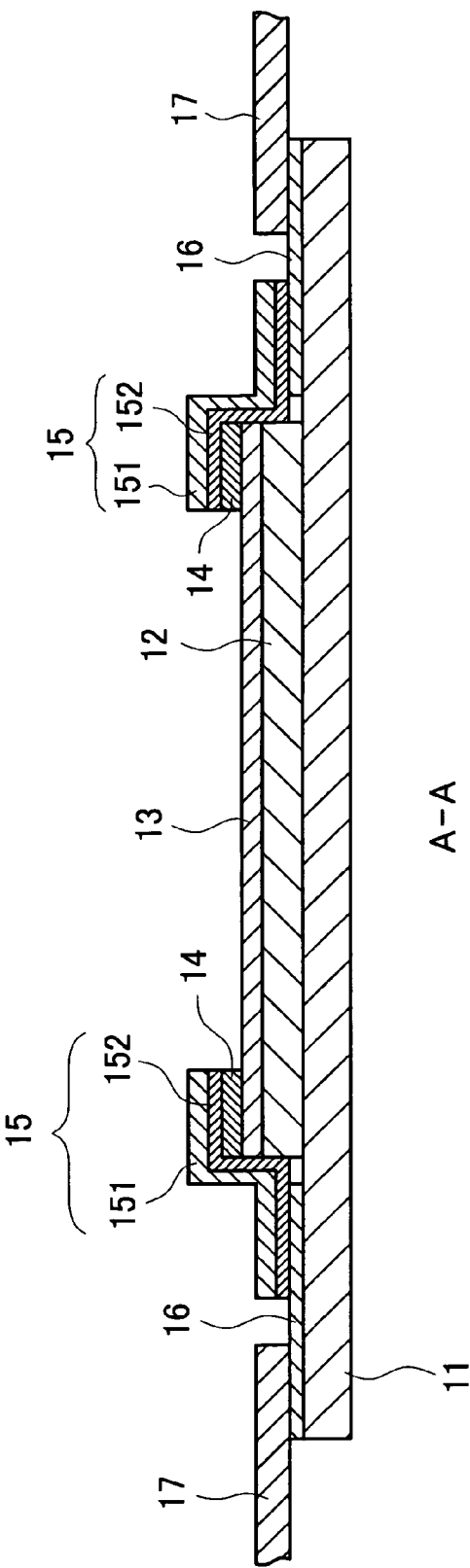
FIG. 2 is a cross-sectional view taken along a line A-A in FIG. 1.

FIG. 1 is a perspective view showing a liquid crystal display panel of a liquid crystal display device according to the embodiment 1 of the present invention, and FIG. 2 is a cross-sectional view taken along a line A-A in FIG. 1. FIG. 1 depicts only the liquid crystal display panel taken out from the liquid crystal display device. The liquid crystal display panel is formed by sandwiching a liquid crystal layer not shown in the drawing between a TFT substrate 11 on which TFTs, pixel electrodes and the like are formed and a color filter substrate 12 on which color filters and the like are formed. For mounting lines for supplying a power source, signals and the like to the liquid crystal display panel on the TFT substrate 11, a size of the TFT substrate 11 is set larger than a size of the color filter substrate 12.

Although a polarizer is adhered to a front surface of the color filter substrate 12 and a back surface of the TFT substrate 11, these polarizers are omitted in FIG. 1. A flexible printed circuit board 17 for supplying a power source, signals and the like to the liquid crystal display panel from the outside is mounted on one end portion of the TFT substrate 11 by heat sealing (thermo compression bonding) or the like. In assembling the flexible printed circuit board 17 as a part of the liquid crystal display device, the flexible printed circuit board 17 is folded back to a back side thus suppressing the increase of a profile of the display device.

An ITO film which constitutes a transparent conductive film 13 is formed over the whole front surface of the color filter substrate 12. Although the transparent conductive film is made of ITO in this embodiment, in view of a demand for a proper resistance value as a heater, the transparent conductive film may be made of IZO, AZO, $SnO_2$ or the like besides ITO. On the ITO film 13 at both end portions of the color filter substrate 12, an electrode 14 for supplying an electric current to the ITO film 13 is formed by Ni plating. By supplying the electric current to the ITO film 13 under a low-temperature environment, the liquid crystal display panel is heated to allow the liquid crystal display device to quickly start a normal display.

It is necessary to supply an electric current from the outside to the ITO film 13 to use the ITO film 13 as the heater. In the embodiment 1, a conductive tape 15 is formed on an end portion of the electrode 14, is routed along a side portion of the color filter substrate 12, and extends over the TFT substrate 11. A conductive film 16 having a relatively large width is formed on the TFT substrate 11 for supplying a heater current. So long as the conductive film 16 exhibits small resistance, a width, a thickness or the like of the conductive film 16 may be arbitrarily decided corresponding to a size of the substrate or the like. The conductive film 16 is connected with the flexible printed circuit board 17, and the heater current is supplied to the conductive film 16 from the outside through the flexible printed circuit board 17.

In FIG. 1, it is desirable that the whole surface of the liquid crystal display panel is uniformly heated. That is, it is desirable that the heater current is uniformly supplied to a whole surface of the color filter substrate 12. By setting the sheet resistance of the plated electrode 14 smaller than the sheet resistance of the ITO film 13, as shown in FIG. 1, it is possible to uniformly supply the electric current from the left to the right or from the right to the left as indicated by arrows. The resistivity of the ITO film 13 is largely changed within a range from $10^{-3}\Omega$ cm to $100\Omega$ cm depending on a manufacturing method. In this embodiment, the ITO film 13 is formed by sputtering, and the resistivity of the ITO film 13 is approximately $10^{-3}\Omega$ cm. The resistivity of the Ni electrode 14 formed by plating as the electrode 14 is approximately $8\times10^{-6}\Omega$ cm which is approximately $1/100$ of the resistivity of the ITO film 13. Accordingly, even when a thickness of the Ni plated film is approximately equal to a thickness of the ITO film 13, the resistance of the Ni plated film is sufficiently small compared to the resistance of the ITO film 13 and hence, as indicated by the allows shown in FIG. 1, it is possible to uniformly supply the electric current to the surface of the ITO film 13. It is needless to say that a relatively thick film can be easily formed by plating and, in this case, it is possible to uniformly supply the electric current with a sufficient margin. In the present invention, the sheet resistance of the electrode 14 may preferably be set to a value equal to or less than $1/1000$ of the sheet resistance of the ITO film 13.

In setting the resistance of the ITO film 13 to approximately $100\Omega$, assuming the resistivity of ITO as $10^{-3}\Omega$ cm, in a screen as shown in FIG. 1, a film thickness of the ITO film 13 is set to approximately 100 nm. On the other hand, in this embodiment, a thickness of the Ni plated film is set to 50 µm. Accordingly, due to the constitution of this embodiment, it is possible to uniformly supply the electric current to the ITO film 13 so as to uniformly heat the color filter substrate 12. Although the thickness of the Ni plated film is set to 50 µm in this embodiment, since the resistivity of the Ni plated film is extremely small, even when the thickness of the Ni plated film is approximately 1 µm, the Ni plated film can play a role as the electrode 14 of the ITO film 13.

FIG. 2 is a cross-sectional view taken along a line A-A in FIG. 1. As explained in conjunction with FIG. 1, the ITO film 13 used as the heater is formed over the whole surface of the counter substrate. The Ni plated film which constitutes the electrode 14 is formed on both ends of the ITO film 13. To make the electrode 14 formed by Ni plating and the conductive film 16 of the TFT substrate 11 conductive with each other, the conductive tape 15 is provided. The conductive tape 15 is formed by mounting a conductive adhesive material on a back surface of a tape-shaped metal foil 151. The conductive adhesive material is formed by dispersing fine particles made of Ni or the like in an adhesive material made of acryl. Fine particles maybe copper fine particles, Al fine particles, silver fine particles or the like besides Ni fine particles. Further, graphite fine particles may be used besides these metal fine particles. The tape-shaped metal foil 151 is formed of Al foil, copper foil or the like. Since a thickness of the metal foil 151 is small, that is, approximately 50 µm, the conductive tape 15 is flexible. Accordingly, the conductive tape 15 can easily follow profiles of the color filter substrate 12, the TFT substrate 11 and the like and are adhered to these parts. Here, the resistance of the adhesive-material-portion of the conductive tape 15 may be adjusted by adjusting a quantity of metal particles dispersed in the adhesive material.

The conductive tape 15 is connected with the conductive film 16 formed on the TFT substrate 11, and the conductive film 16 is connected with the flexible printed circuit board 17. An electric current is supplied to the ITO film 13 which constitutes the heater through the flexible printed circuit board 17. This embodiment is that the color filter substrate 12 and the TFT substrate 11 are made conductive with each other using the conductive tape 15 and hence, the connection operation can be easily performed without requiring a large connection space.

The present invention is that the ITO film 13 which constitutes the heater is closely adhered to the color filter substrate 12 and hence, heat generated by the ITO film 13 can be efficiently transmitted to the liquid crystal layer. In winter season, the temperature of the inside of an automobile may be lowered to approximately −20° C. The liquid crystal display panel cannot be operated normally at such low temperature. When the temperature of the liquid crystal layer becomes approximately 0° C., the operation of the liquid crystal display panel becomes substantially equal to the normal operation. Accordingly, during the winter season, it is necessary to elevate the temperature of the liquid crystal layer by approximately 20° C. during the shortest time possible. The shorter the temperature elevation time, the operation of the liquid crystal display panel can be improved. An allowable time limit of temperature elevation is approximately 1 minute.

The operation of the liquid crystal display panel is evaluated when the liquid crystal display panel is heated using only the ITO film 13 formed on the counter substrate. A result of the evaluation is as follows. That is, the time required for elevating the temperature of the liquid crystal is approximately evaluated based on electric power inputted to the ITO film 13 and heat capacity of the liquid crystal display panel.

The ITO film 13 is formed on the color filter substrate 12 in the liquid crystal display panel, and generated heat reaches the liquid crystal through the color filter substrate 12 and hence, the heat capacity of the color filter substrate 12 is important among heat capacities of the parts of the liquid crystal panel. The heat capacity is obtained by multiplying volume, specific gravity and specific heat. The evaluation is made using a liquid crystal display panel of 8 inch having an aspect ratio of 16:9 as the display device. Here, the liquid crystal display panel has a lateral size of 18.2 cm and a longitudinal size of 11.2 cm, and a thickness of the color filter substrate 12 is 0.07 cm. Assuming a specific weight of the glass as 2.5 and a specific heat of the glass as 0.75J/gK, the heat capacity becomes 26.76J/K. Accordingly, to elevate the temperature of the liquid crystal layer by 20° C., heat capacity of 535.2J (210×20=535.2J) becomes necessary. To input this energy within 60 seconds, electric power of approximately 8.92W becomes necessary. In the above-mentioned evaluation, heat capacity of the upper polarizer is ignored. On the other hand, electric power of a backlight 24 used for a screen having the substantially same size is approximately 5W to 7W and hence, the electric power can be supplied through the flexible printed circuit board 17 using the constitution shown in FIG. 1.

Figure 3:
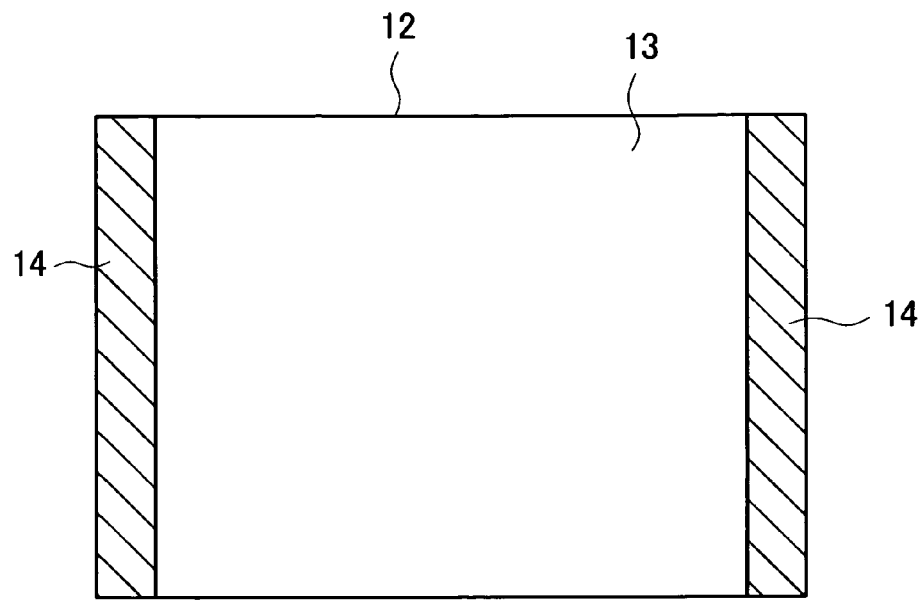
FIG. 3 is a plan view of a color filter substrate after plating.
Figure 4A:
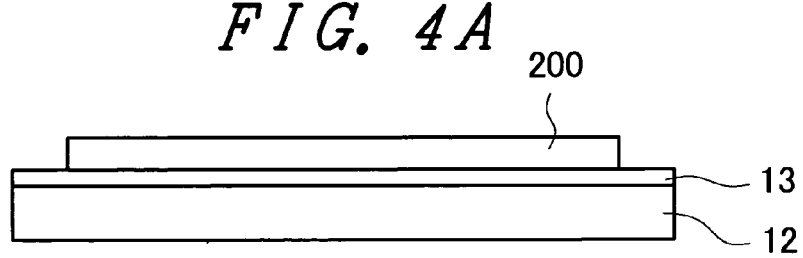
FIG. 4A to FIG. 4C are views showing steps for forming an electrode by plating.
Figure 4B:
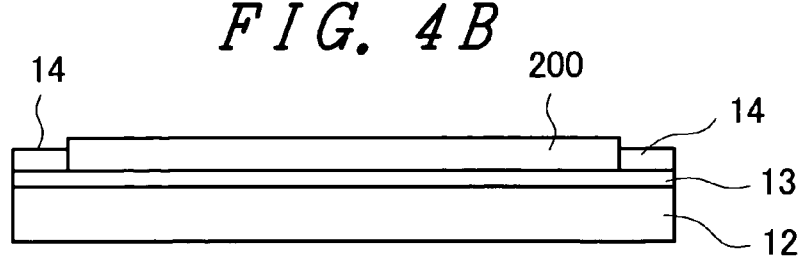
Figure 4C:
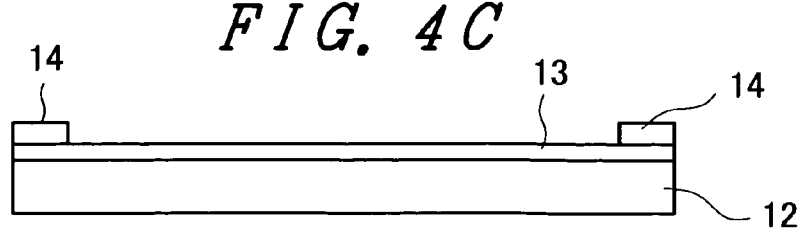

FIG. 3 is a plan view of the color filter substrate 12 on which the ITO film 13 and the Ni electrodes 14 are formed. In this embodiment, a thickness of the ITO film 13 is 100 nm and a thickness of the electrode 14 formed by Ni plating is 50 µm. FIG. 4A to FIG. 4C show a method of forming the Ni electrode 14. FIG. 4A shows a state in which a mask 200 is formed on the color filter substrate 12 on which the ITO film 13 is formed. Thereafter, as shown in FIG. 4B, the color filter substrate 12 is immersed in a plating bath so as to apply Ni plating to portions of the color filter substrate 12 except for portions covered with the mask 200. Then, by removing the mask 200 from the color filter substrate 12, the Ni plated film is formed on both ends of the color filter substrate 12. Plating is advantageous in easily forming a thick film. Although the example which forms the plating layer by Ni plating is explained, the plating layer may be formed by copper plating or the like besides Ni plating.

Figure 5:
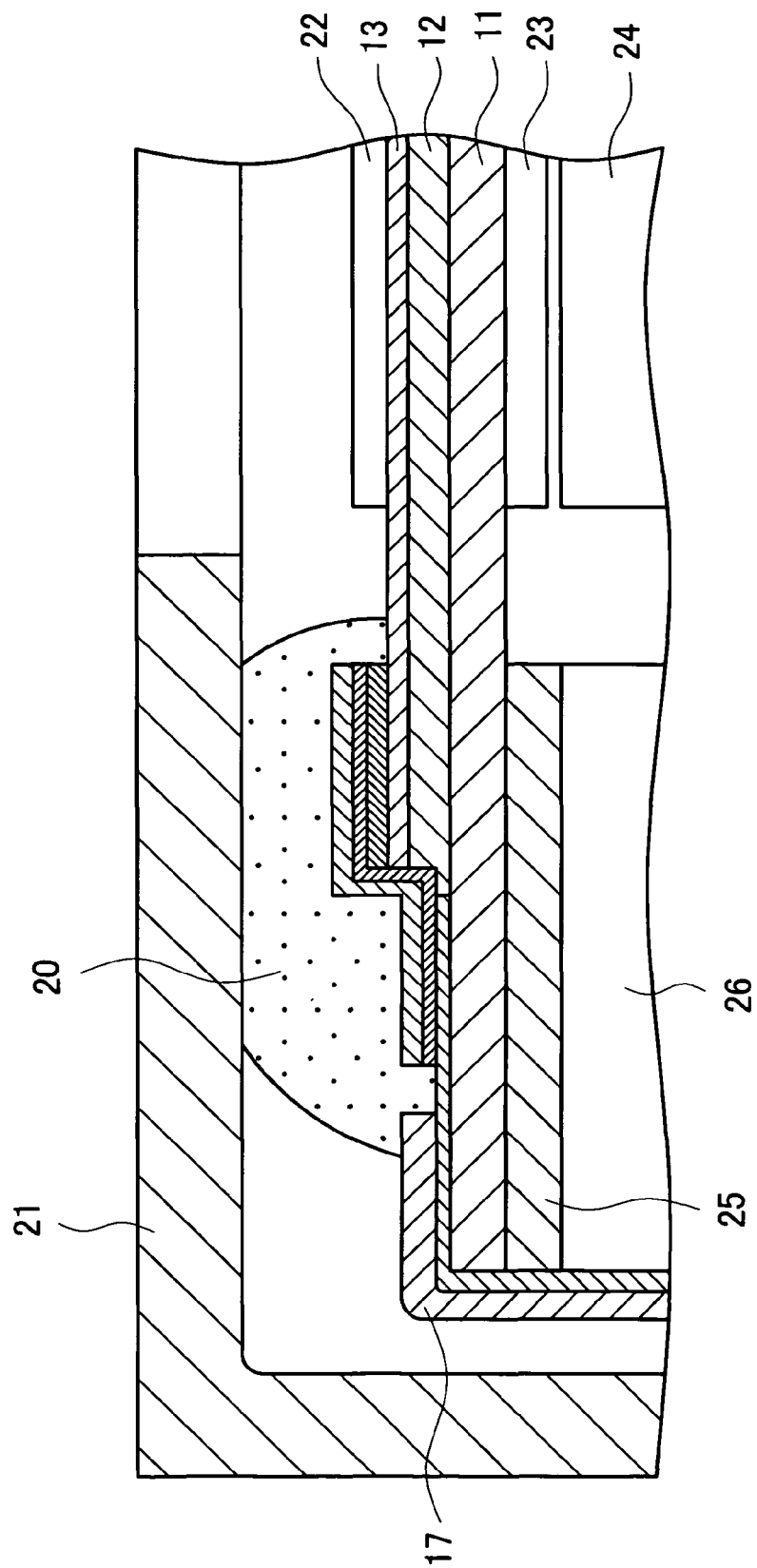
FIG. 5 is a cross-sectional view showing a state in which a liquid crystal display panel is housed in an upper frame.

FIG. 5 is a schematic cross-sectional view showing a state in which the liquid crystal display panel of this embodiment is assembled in the inside of a frame of the display device. An upper frame 21 which covers a periphery of the liquid crystal display panel is made of metal, in general. Accordingly, when the upper frame 21 is brought into contact with either the Ni electrode 14 or the conductive tape 15, an electric current leaks and hence, the electric current is not concentrated on the ITO film 13. To prevent such a phenomenon, an insulation protective cover 20 is formed between the conductive tape 15 or the Ni electrode 14 and the upper frame 21. In FIG. 5, a resin such as a silicon resin, for example, is arranged as the insulation protective cover 20. However, when an area to be covered by the insulation protective cover 20 is large, an insulation sheet which forms an insulation adhesive material on one side thereof may be used as the insulation protective cover 20.

In FIG. 5, the flexible printed circuit board 17 is bent toward a back surface side of the liquid crystal display device at an end portion of the TFT substrate 11. The TFT substrate 11 is mounted on a holding member 26 by way of a light blocking layer 25 which forms an adhesive material on both surfaces thereof. An upper polarizer 22 is adhered to the ITO film 13 of the color filter substrate 12, while a lower polarizer 23 is adhered to a lower side of the TFT substrate 11. The backlight 24 including a group of optical sheets is arranged below the lower polarizer 23.

Figure 6:
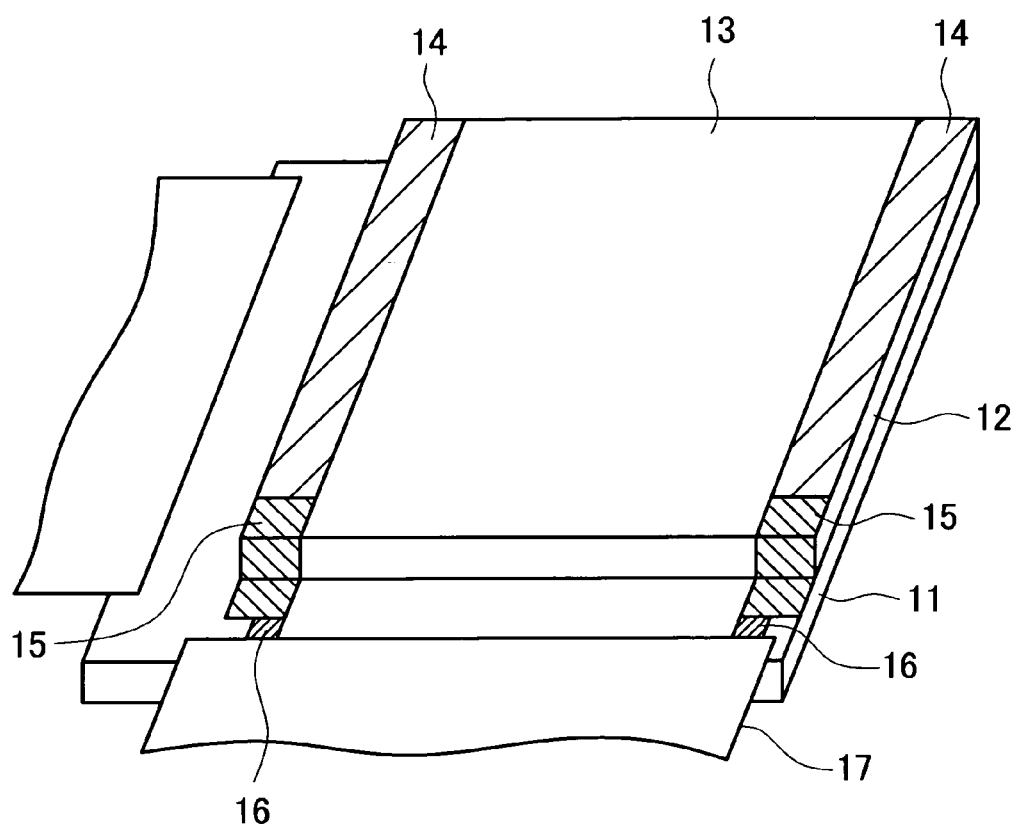
FIG. 6 is a view of a liquid crystal display panel of a liquid crystal display device according to a modification of the embodiment 1.

FIG. 6 shows a liquid crystal display panel of a liquid crystal display device according to a first modification of this embodiment. The constitution which makes the first modification shown in FIG. 6 different from this embodiment shown in FIG. 1 lies in that the conductive tape 15 for supplying an electric current to the ITO film 13 is formed on the same side of the liquid crystal display panel. In FIG. 6, the conductive tape 15 and the conductive film 16 on the TFT substrate 11 are formed on a side where a data signal circuit is formed. After starting the liquid crystal display device, an electric current is supplied to the ITO film 13 for a fixed time and, thereafter, the electric current is cut off. A control circuit is necessary for such a control. Since a line for supplying an electric current to the ITO film 13 is formed on the same flexible printed circuit board 17, such a control circuit can be easily installed.

Figure 7:
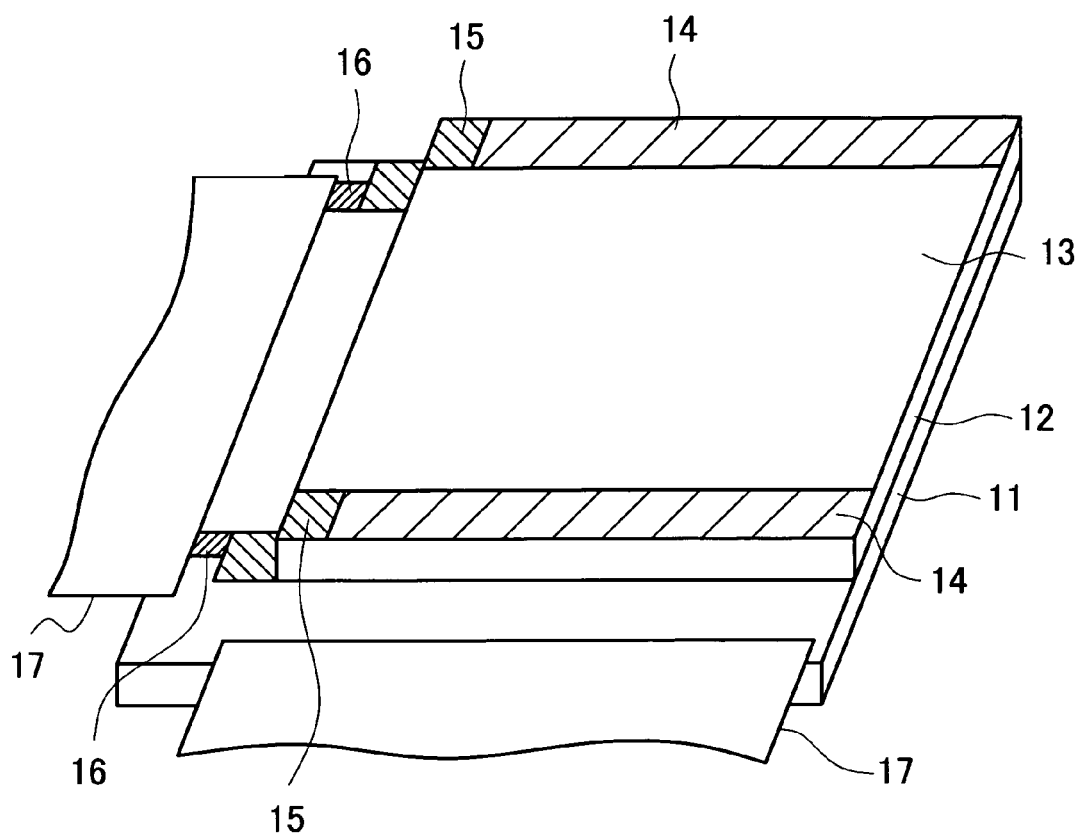
FIG. 7 is a view of a liquid crystal display panel of a liquid crystal display device according to another modification of the embodiment 1.

FIG. 7 shows a liquid crystal display panel of a liquid crystal display device according to a second modification of this embodiment. In FIG. 7, the conductive tape 15 and the conductive film 16 on the TFT substrate 11 for supplying an electric current to the ITO film 13 are formed on a TFT-substrate-11 side where a scanning signal circuit is formed. Due to the formation of the conductive tape 15 and the conductive film 16 on the same side of the liquid crystal display panel, the second modification can also acquire the same advantageous effect as the first modification explained in conjunction with FIG. 6. In FIG. 7, since the line for supplying an electric current is formed on the scanning-signal-circuit side having a circuit scale smaller than a circuit scale on the data-signal-circuit side, this modification can acquire an advantageous effect that a width of the conductive film 16 formed on the TFT substrate 11 can be increased.

[Embodiment 2]

Figure 8:
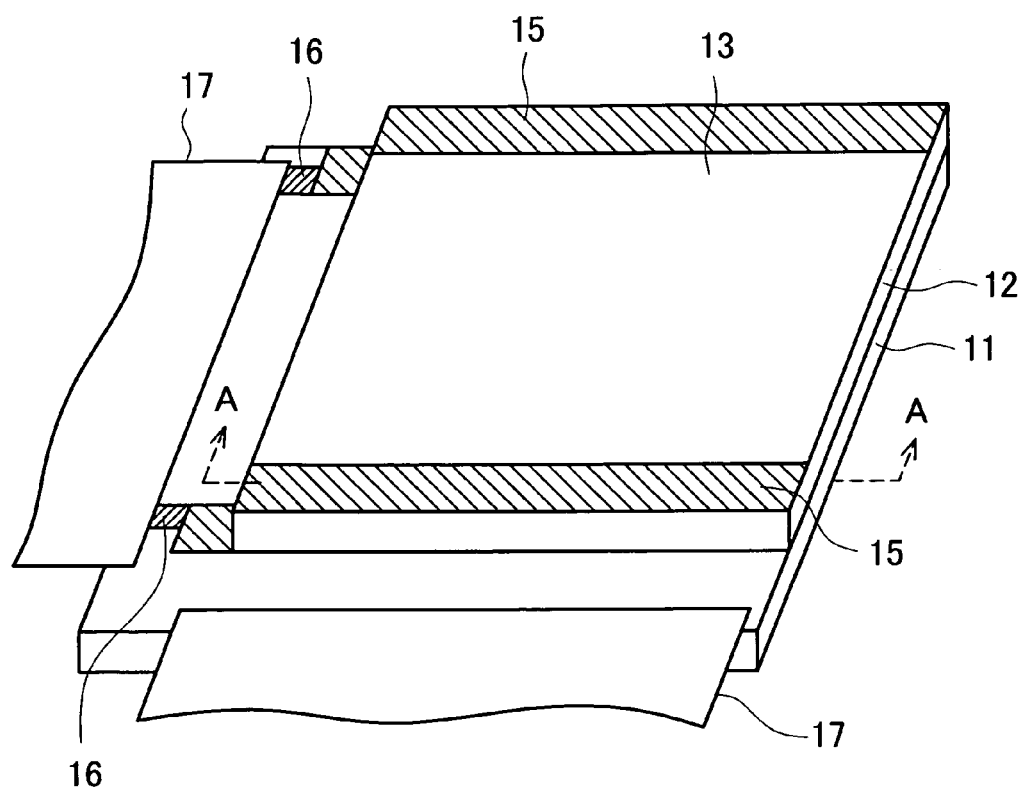
FIG. 8 is a perspective view of a liquid crystal display panel of a liquid crystal display device according to an embodiment 2.
Figure 9:
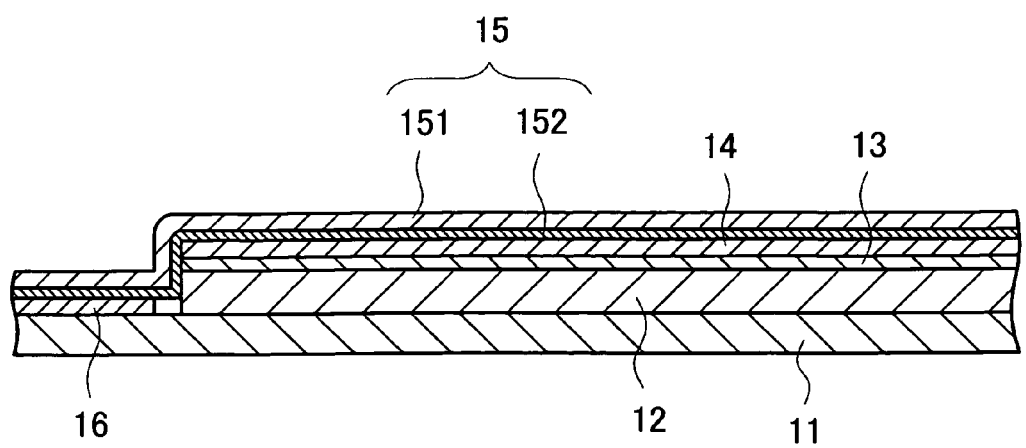
FIG. 9 is a cross-sectional view of the liquid crystal display panel according to the embodiment 2 taken along a line A-A in FIG. 8.

FIG. 8 is a perspective view showing a liquid crystal display panel of a liquid crystal display device according to an embodiment 2 of the present invention. The constitution which makes this embodiment 2 different from the constitution of the embodiment 1 shown in FIG. 7 or the like lies in that a conductive tape 15 for supplying an electric current to an ITO film 13 is formed along the whole side at end portions of the color filter substrate 12. FIG. 9 is a cross-sectional view taken along a line A-A in FIG. 8. In FIG. 9, the ITO film 13 is formed on a counter substrate, and an Ni plated film which constitutes an electrode 14 is formed on the ITO film 13. Further, the conductive tapes 15 are formed to cover the whole plating layer.

When the ITO film 13 is used as a heater, even when the same power is inputted to the ITO film 13, a heating state differs depending on conditions of the display device including a condition in which a large quantity of electric current is supplied to the ITO film 13 by making the resistance of the ITO film 13 small, a condition in which an applied voltage is elevated by increasing the resistance of the ITO film 13 or the like. When a large quantity of electric current is supplied to the ITO film 13 by making the resistance of the ITO film 13 small, the electric current which flows in the ITO film 13 becomes non-uniform depending on locations thus giving rise to a possibility that the liquid crystal display panel cannot be uniformly heated. Particularly, such a drawback occurs when a thickness of the electrode 14 formed by Ni plating cannot be sufficiently increased.

In the embodiment shown in FIG. 9, the conductive tape 15 is formed to cover the whole Ni plating layer which constitutes the electrode 14 and hence, even when a large quantity of electric current flows in the ITO film 13, it is possible to prevent the electric current which flows in the ITO film 13 from becoming non-uniform. That is, a metal foil 151 of the conductive tape 15 is made of copper or aluminum and, further, the metal foil 151 usually has a thickness of approximately 50 μm or more and hence, the resistance of the metal foil 151 is remarkably smaller than the resistance of the ITO film 13 whereby the resistance of the metal foil 151 can be ignored. Accordingly, it is possible to uniformly supply the electric current to the ITO film 13 parallel to sides of the color filter substrate 12.

Figure 10:
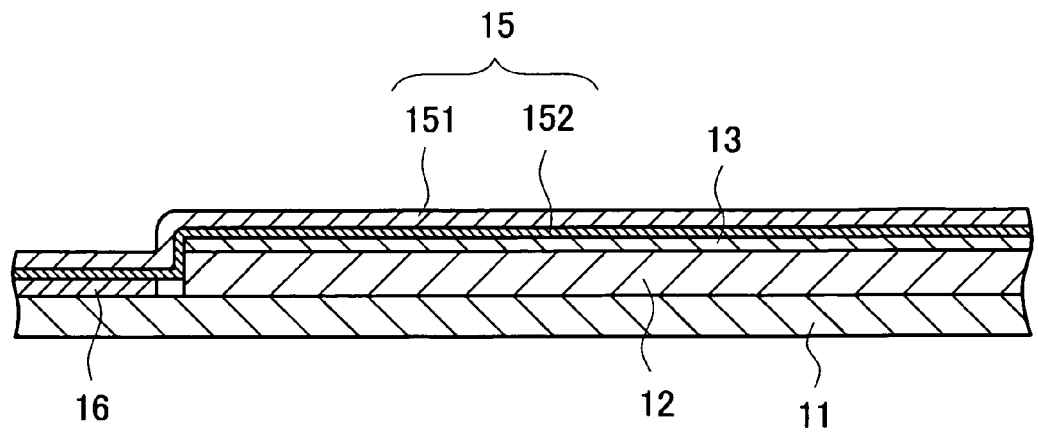
FIG. 10 is a cross-sectional view showing another mode of the liquid crystal display panel of a liquid crystal display device according to the embodiment 2.

FIG. 10 shows a liquid crystal display panel of a liquid crystal display device according to a modification of the embodiment 2. A plan view of the liquid crystal display panel shown in FIG. 10 is substantially equal to FIG. 8 which is the plan view. That is, FIG. 10 is a cross-sectional view taken along a line A-A in FIG. 8. In FIG. 10, an ITO film 13 used as a heater is formed on a counter substrate. The constitution which makes this modification different from the constitution of the embodiment 2 shown in FIG. 9 lies in that an Ni plating layer which constitutes an electrode 14 is not formed on the ITO film 13. That is, the conductive tape 15 is directly formed on the ITO film 13. In this case, it is necessary to form a conductive tape 15 over the whole area of one side of a color filter substrate 12.

The formation of the plating layer requires the steps shown in FIG. 4 and hence, a manufacturing cost is pushed up. The conductive tape 15, as explained in conjunction with FIG. 9, exhibits the extremely small resistance due to the use of a tape formed of a metal foil 151. Accordingly, even when the plating layer is not interposed between the ITO film 13 and the conductive tape 151, with the use of the metal foil 15 as the electrode 14 of the ITO film 13, it is possible to make the flow of an electric current through the ITO film 13 uniform. Accordingly, the manufacturing cost of the liquid crystal panel having the ITO heater can be reduced.

The above-mentioned embodiment 2 is explained in conjunction with the constitution corresponding to the constitution of the embodiment 1 shown in FIG. 7. It is needless to say, however, that the embodiment 2 is also applicable to the constitution shown in FIG. 1, FIG. 6 and the like in the embodiment 1.

[Embodiment 3]

In the embodiment 1 and the embodiment 2, the electric current is supplied to the ITO film 13 via the flexible printed circuit board 17. Lines of the flexible printed circuit board 17 are formed in the same process used by other signal lines and the like. Even when a design is made to increase a width of the line for heating, the reduction of a line resistance value is limited. Accordingly, as explained in conjunction with the embodiment 1, there may be a case that it is difficult to supply a large quantity of electric power which can sufficiently elevate the temperature of the liquid crystal display panel within a short time. In the embodiment 1, it is evaluated that it is necessary to input the electric power of 8.92W for elevating the temperature of the liquid crystal layer by 20° C. within 60 seconds. However, in an actual operation, heat is transferred to the upper polarizer 22 adhered to the ITO film 13 and hence, the electric power necessary for elevating the temperature of the liquid crystal layer is further increased.

Figure 11:
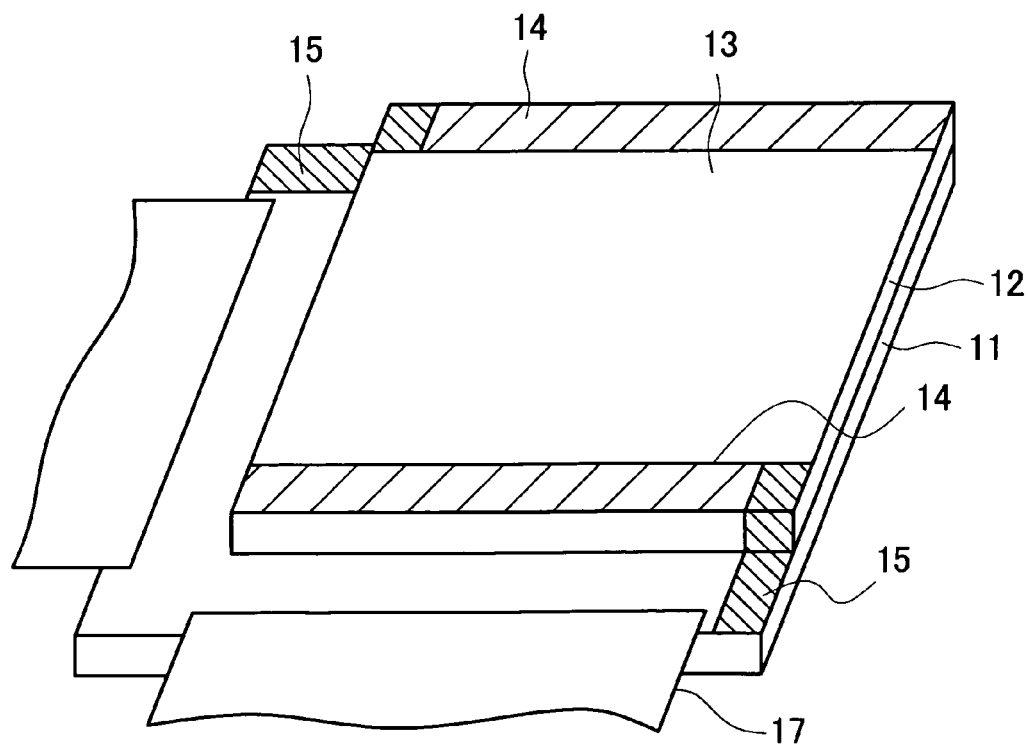
FIG. 11 is a view of a perspective view of a liquid crystal display panel of a liquid crystal display device according to an embodiment 3.

This embodiment is, as shown in FIG. 11, that by adopting independent lines which do not pass the flexible printed circuit board 17 as lines which supply an electric current to the ITO film 13, the more efficient supply of an electric current to the ITO film 13 ensures. In FIG. 11, the constitution on the counter substrate is substantially equal to the corresponding constitution in the embodiment 1. That is, the ITO film 13 is formed on a color filter substrate 12, and an Ni plating layer which constitutes an electrode 14 or the like is formed on end portions of the ITO film 13. The Ni plating layer and a conductive tape 15 are brought into contact with each other, the conductive tape 15 is routed along a side surface of the color filter substrate 12, and the conductive tape 15 extends to an end portion of a TFT substrate 11. An electric current is directly supplied to the conductive tape 15 from the outside.

Since the conductive tape 15 is formed of a copper foil or an aluminum foil having a thickness of approximately 50 μm, the resistance of the conductive tape 15 is sufficiently small. Further, the electrode 14 formed on an end portion of the ITO film 13 can easily form a thick plating layer and hence, the electrode 14 can possess the sufficiently small electric resistance. In this manner, according to this embodiment, there arises no particular drawback from a viewpoint of current capacitance and hence, it is possible to arbitrarily set the electric power to be inputted so long as a phenomenon that the temperature in the vicinity of the ITO film 13 is extremely elevated so that a thermal strain is generated can be obviated.

Figure 12:
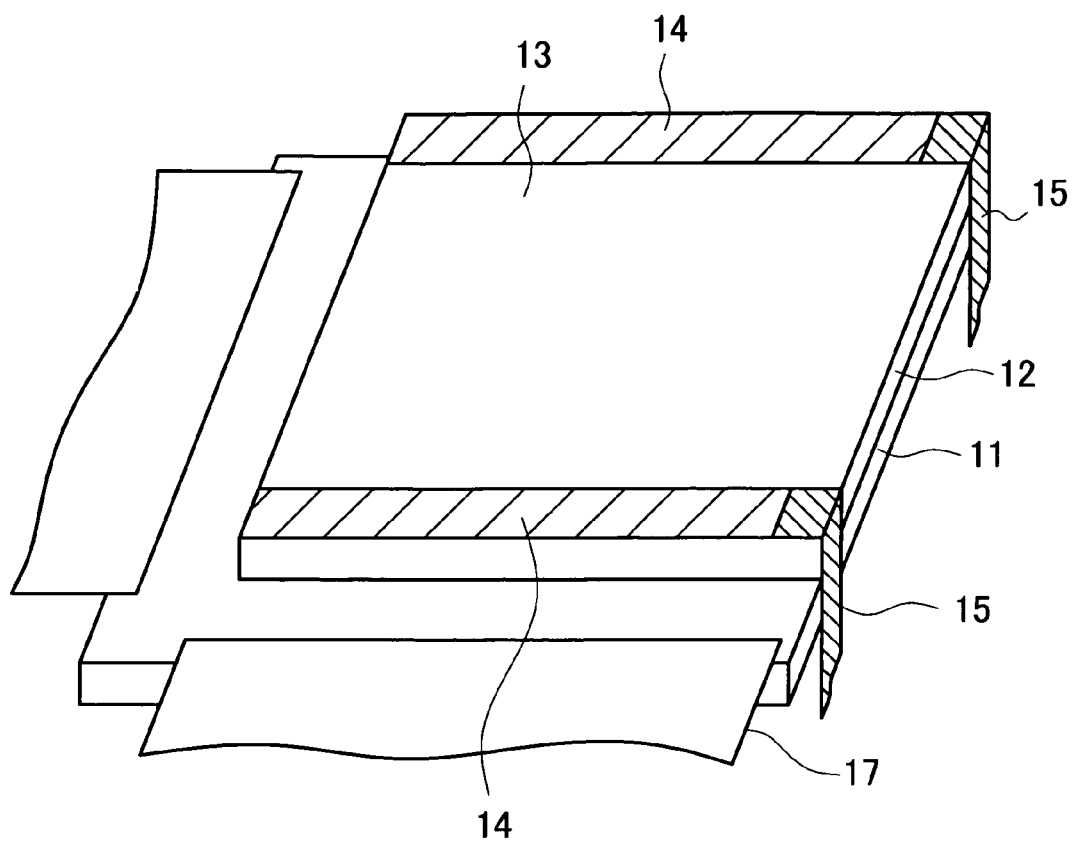
FIG. 12 is a view of a liquid crystal display panel of a liquid crystal display device according to a modification of the embodiment 3.
Figure 13:
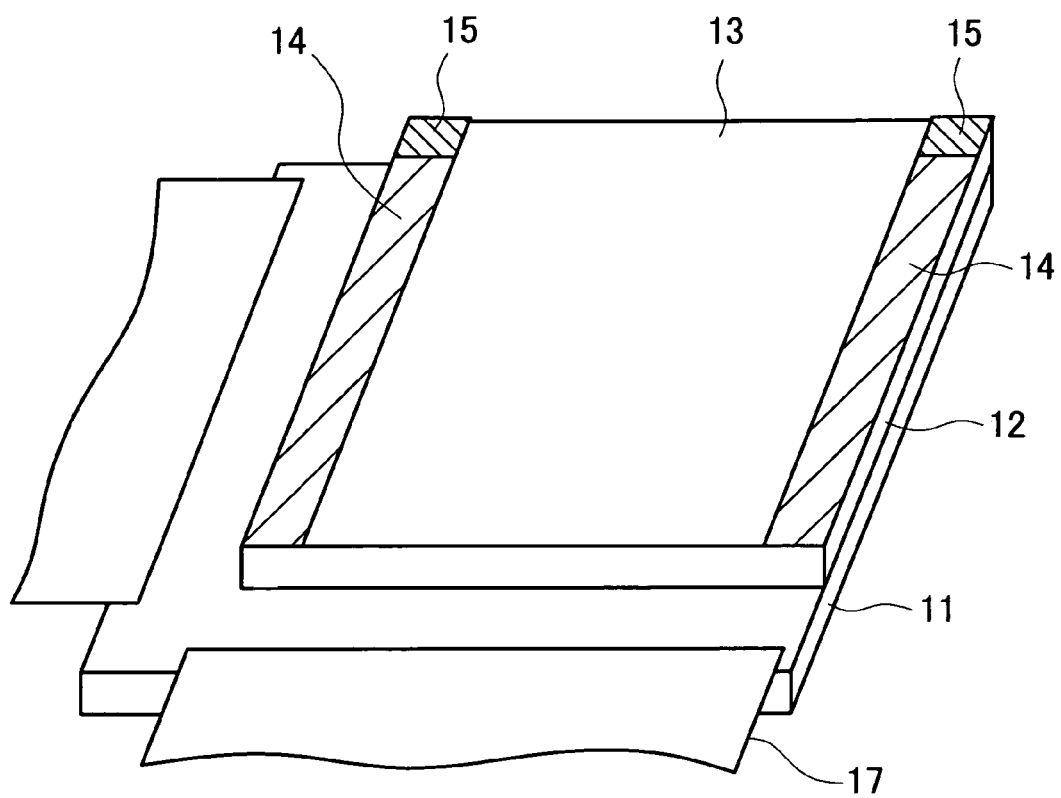
FIG. 13 is a liquid crystal display panel of a liquid crystal display device according to another modification of the embodiment 3.

FIG. 12 shows a liquid crystal display panel of a liquid crystal display device according to a modification of the embodiment 3. The constitution on the color filter substrate 12 shown in FIG. 12 is substantially equal to the corresponding constitution shown in FIG. 11. In FIG. 12, conductive tapes 15 formed on end portions of electrodes 14 formed of a plating layer are not routed along a front surface of a TFT substrate 11 but are routed along a side surface of the color filter substrate 12 and a side surface of the TFT substrate 11 and are connected to a heater power source not shown in the drawing which is arranged on a back surface side of a liquid crystal display panel. In this embodiment, it is unnecessary to arrange a conductive film 16 and the conductive tapes 15 on the TFT substrate 11 and hence, a space for a data signal drive circuit, a scanning signal drive circuit or the like can be sufficiently ensured. FIG. 13 shows a liquid crystal display panel of a liquid crystal display device according to still another modification of the embodiment 3. The constitution of this modification is substantially equal to the constitution of the modification shown in FIG. 12 except for that this modification differs from the modification shown in FIG. 12 with respect to a side from which a conductive tape 15 is pulled out. Depending on a liquid crystal display device, or a demand on structure such as the arrangement of the electrodes 14 formed of the plating layer or the resistance of ITO film 13, either one of the constitutions shown in FIG. 12 and FIG. 13 may be used.

In FIG. 11 to FIG. 13, the end portion of the plating layer and the conductive tape 15 are connected with each other. However, the embodiment 3 is not limited to such constitution. That is, as explained in conjunction with the embodiment 2, the conductive tape 15 may be formed to cover the whole plating layer which constitutes the electrode 14. In this case, the current capacitance can be further increased. Further, as explained in conjunction with another example of the embodiment 2, the conductive tape 15 may be directly used as an electrode without forming the electrode 14 formed of the plating layer. In this case, a cost incurred by the formation of the electrode by plating can be saved.

[Embodiment 4]

In the embodiment 1 to the embodiment 3, the conductive tape 15 is used as a conductive body for supplying an electric current to the ITO film 13. Although the conductive tape 15 exhibits excellent properties with respect to operability and a space factor, the conductive tape 15 uses a conductive adhesive material for adhering the conductive tape 15 with a conductive body. The conductive adhesive material is produced by dispersing conductive fine particles made of Ni, copper or the like in an adhesive material made of acryl or the like and has fixed resistance. Since a thickness of an adhesive layer 152 is approximately 30 μm and hence, the electric resistance of the conductive tape 15 does not become large. However, when an electric current which flows in ITO is increased, such small resistance may also give rise to a drawback.

Figure 14:
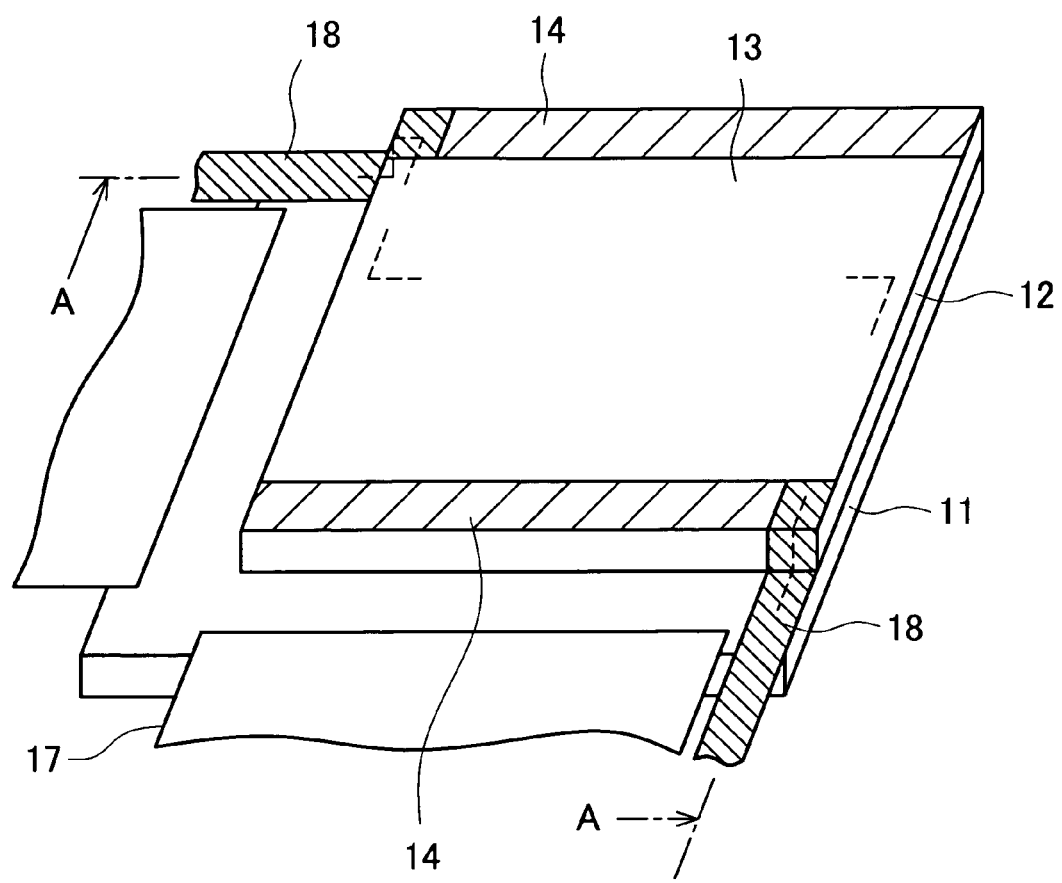
FIG. 14 is a perspective view of a liquid crystal display panel of a liquid crystal display device according to an embodiment 4.

A liquid crystal display panel of a liquid crystal display device according to the embodiment 4 is that a flat cable 18 which uses metal as a conductive body is used without using the conductive tape 15, and the flat cable 18 is connected with a plating layer which constitutes the electrode 14 made of ITO using solder 19. FIG. 14 is a plan view of the liquid crystal display panel of the liquid crystal display device according to the embodiment 4. In FIG. 14, the constitution on a counter substrate is substantially equal to the corresponding constitutions of the embodiment 1 to the embodiment 3. That is, the ITO film 13 is formed on the color filter substrate 12, and electrodes 14 are formed on end portions of the ITO film 13 by plating. Further, the flat cables 18 are connected to the end portions of the plating electrodes 14 using the solder 19.

Figure 15:
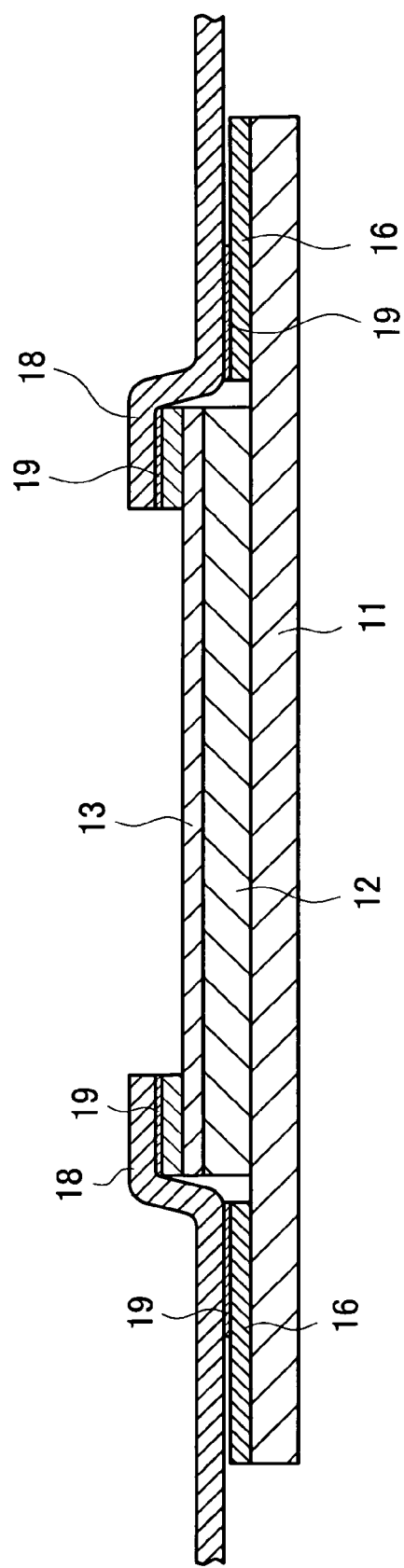
FIG. 15 is a cross-sectional view taken along a line A-A in FIG. 14.

FIG. 15 is a cross-sectional view taken along a line A-A in FIG. 14. In FIG. 15, the solder 19 is preliminarily applied to necessary portions of the flat cable 18. In the color filter substrate 12, the solders 19 of the flat cables 18 are connected to the plating films by a reflow technique. Lines made of a material which can be soldered are preliminarily formed on the TFT substrate 11, and the solder 19 of the flat cable 18 is connected to the lines by a reflow technique. In FIG. 15, although the solder 19 is formed for routing the flat cable 18 along the TFT substrate 11, the solder connection on the TFT-substrate-11 side is not always necessary.

Figure 16:
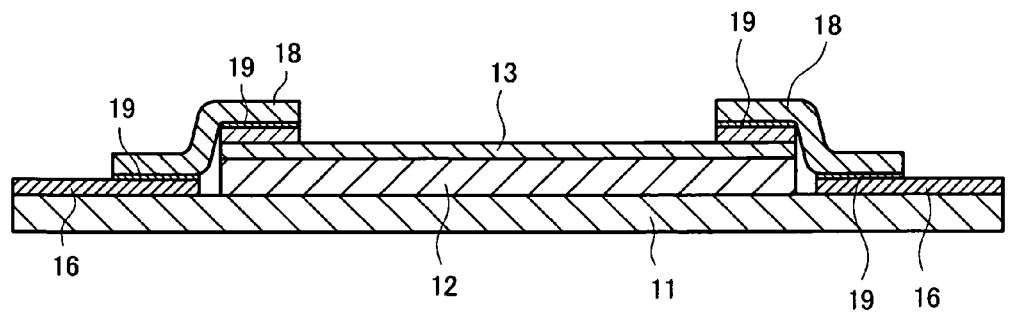
FIG. 16 is a view of a liquid crystal display panel of the liquid crystal display device according to a modification of the embodiment 4.

FIG. 16 shows a liquid crystal display panel of a liquid crystal display device according to a modification of this embodiment. FIG. 16 is a cross-sectional view corresponding to the A-A cross section in FIG. 14. In FIG. 16, the flat cable 18 is used for making the color filter substrate 12 and the TFT substrate 11 conductive with each other. The flat cable 18 is connected with a conductive film 16 which is formed on the TFT substrate 11 and can be connected by soldering on the TFT substrate 11. Further, an electric current is supplied to the ITO film 13 via the conductive film 16 formed on the TFT substrate 11.

Figure 17:
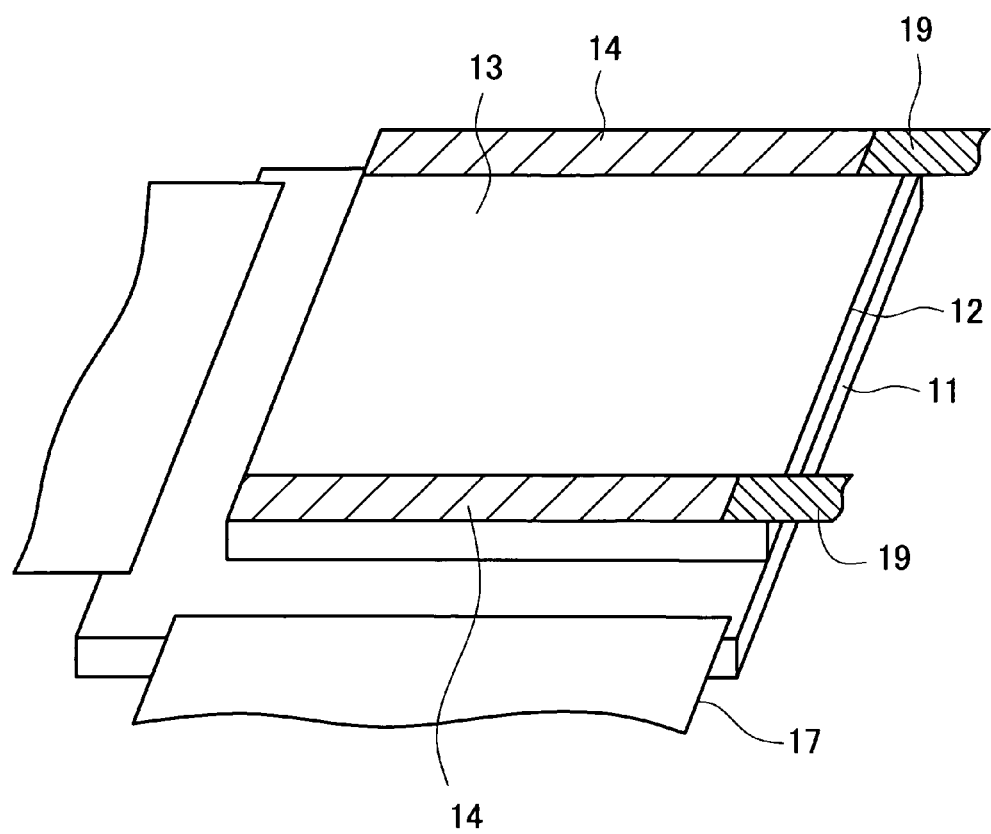
FIG. 17 is a view of a liquid crystal display panel of the liquid crystal display device according to another modification of the embodiment 4.
Figure 18:
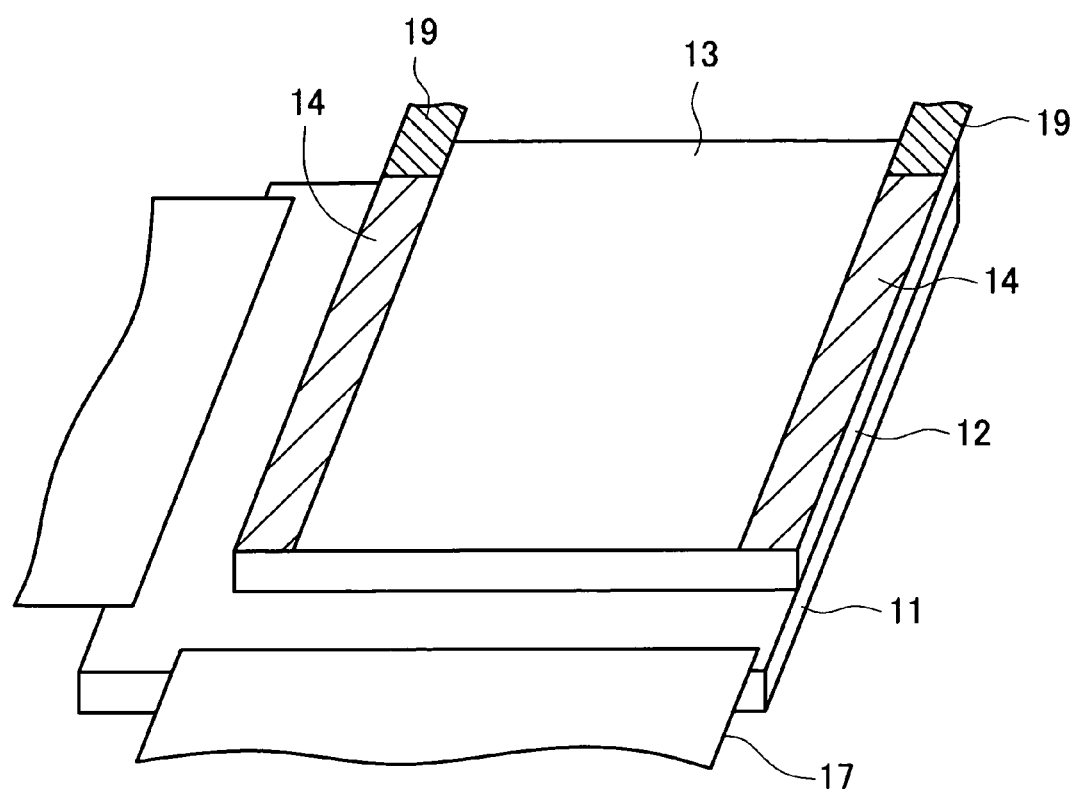
FIG. 18 is a view of a liquid crystal display panel of a liquid crystal display device according to still another modification of the embodiment 4.

FIG. 17 shows a liquid crystal display panel of a liquid crystal display device according to still another modification of the embodiment 4. The flat cable 18 is connected with a plating film and the solder 19 formed on the color filter substrate 12, but are not connected with the TFT substrate 11. The flat cable 18 is folded back to a back surface side of the liquid crystal display panel after being connected with the plating film on the color filter substrate 12. In the example shown in FIG. 17, a line having a large width for supplying an electric current to the ITO film 13 on the TFT substrate 11 is not necessary and hence, a space for a scanning signal drive circuit, a data signal drive circuit or the like can be easily ensured. FIG. 18 shows a liquid crystal display panel of a liquid crystal display device according to still another modification of the embodiment 4. The constitution of the modification shown in FIG. 18 is substantially equal to the constitution of the modification shown in FIG. 17 except for the point that the direction of the plating electrode 14 in the constitution of the modification shown in FIG. 18 is orthogonal to the direction of the plating electrode in the constitution of the modification shown in FIG. 17. Further, advantageous effects acquired by the modification shown in FIG. 18 are substantially equal to the advantageous effects acquired by the modification shown in FIG. 17. Even when the same ITO film 13 is used by the modification shown in FIG. 17 and the modification shown in FIG. 18, the resistance between the electrodes differs between the modification shown in FIG. 17 and the modification shown in FIG. 18. The use of the constitution shown in FIG. 17 or the constitution shown in FIG. 18 maybe determined based on the structure of the display device.

As a method for forming the solder 19, besides a method which preliminarily forms the solder 19 on the flat cable 18, it may be possible to adopt a method which forms the solder 19 on the color-filter-substrate-12 side. That is, after the formation of the ITO film 13 on the color filter substrate 12, the electrode 14 is formed by plating. Thereafter, an end portion of the color filter substrate 12 is immersed in a solder bath filled with molten solder. Due to such immersion of the color filter substrate 12, the solder 19 is adhered to only portions to which plating is applied. Accordingly, the whole plating electrode 14 is covered with the solder 19. In this case, in addition to an operation of the plating electrode 14, the solder 19 also functions as the electrode 14 for supplying an electric current to ITO and hence, the electric current which flows in the ITO film 13 becomes more uniform. The flat cable 18 may be connected with a portion of the solder layer 19 which covers the whole plating electrode 14.

[Embodiment 5]

Figure 19:
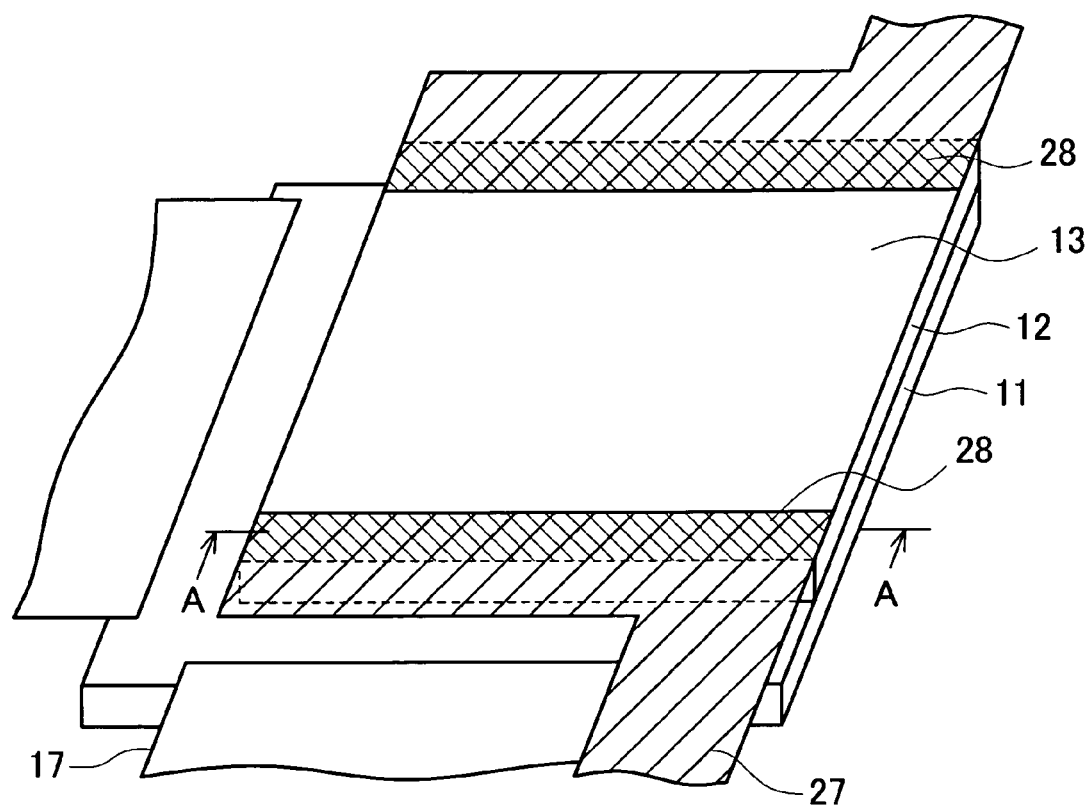
FIG. 19 is a perspective view of a liquid crystal display panel of a liquid crystal display device according to an embodiment 5.
Figure 20:
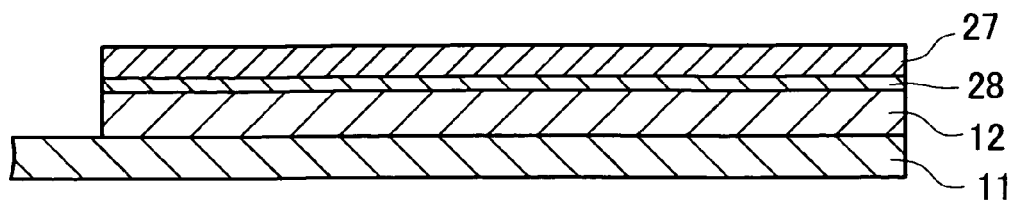
FIG. 20 is a cross-sectional view taken along a line A-A in FIG. 19.

FIG. 19 is a perspective view of a liquid crystal display panel of a liquid crystal display device according to an embodiment 5 of the present invention, and FIG. 20 is a cross-sectional view taken along a line A-A in FIG. 19. In FIG. 19, in the same manner as the embodiment 1 to the embodiment 4, an ITO film 13 which is used as a heater is formed on a front surface of a counter substrate 12. This embodiment is that heater-use flexible printed circuit boards 27 are used as lead members for supplying an electric current from the outside. The flexible printed circuit board 27 of this embodiment supplies data signals, scanning signals or the like and hence, the flexible printed circuit board 27 is, different from the flexible printed circuit board 17 mounted on the TFT substrate, merely formed of a line having a large width for supplying a heater current which flows in the ITO film 13 thus exhibiting the simple constitution. Further, the line formed in the flexible printed circuit board 27 is formed of a copper film having a thickness of approximately 30 μm and hence, the line resistance can be sufficiently decreased. Accordingly, an electric current necessary for using the ITO film 13 as a heater can be supplied without failure.

The heater-use flexible printed circuit board 27 is directly mounted on the ITO film 13 by way of an anisotropic conductive film (ACF) 28. FIG. 20 shows this state in cross section. This embodiment 5 is that the anisotropic conductive film 28 and the heater-use flexible printed circuit board 27 are formed over the whole one side of the color filter substrate and hence, the plating electrode 14 can be omitted. A manufacturing cost of the color filter substrate 12 can be reduced by an amount corresponding to the omission of a plating step. In FIG. 19, the heater-use flexible printed circuit board 27 and the anisotropic conductive film 28 are formed on two horizontal sides of the color filter substrate 12. However, it is needless to say that the heater-use flexible printed circuit board 27 and the anisotropic conductive film 28 may be formed on two vertical sides of the color filter substrate 12 depending on the constitution of the liquid crystal display device.

[Embodiment 6]

In a usual liquid crystal display panel, an image is formed by controlling the transmission of light from a backlight for every pixel by applying a voltage corresponding to an image signal between a pixel electrode 114 formed on the TFT substrate 11 and a common electrode formed on the color filter substrate 12. However, there may be a case that such a usual liquid crystal display device cannot acquire a sufficient viewing angle. The insufficient viewing angle implies a phenomenon that color of an image is changed or contrast is lowered when a screen is viewed from an oblique angle.

Figure 21:
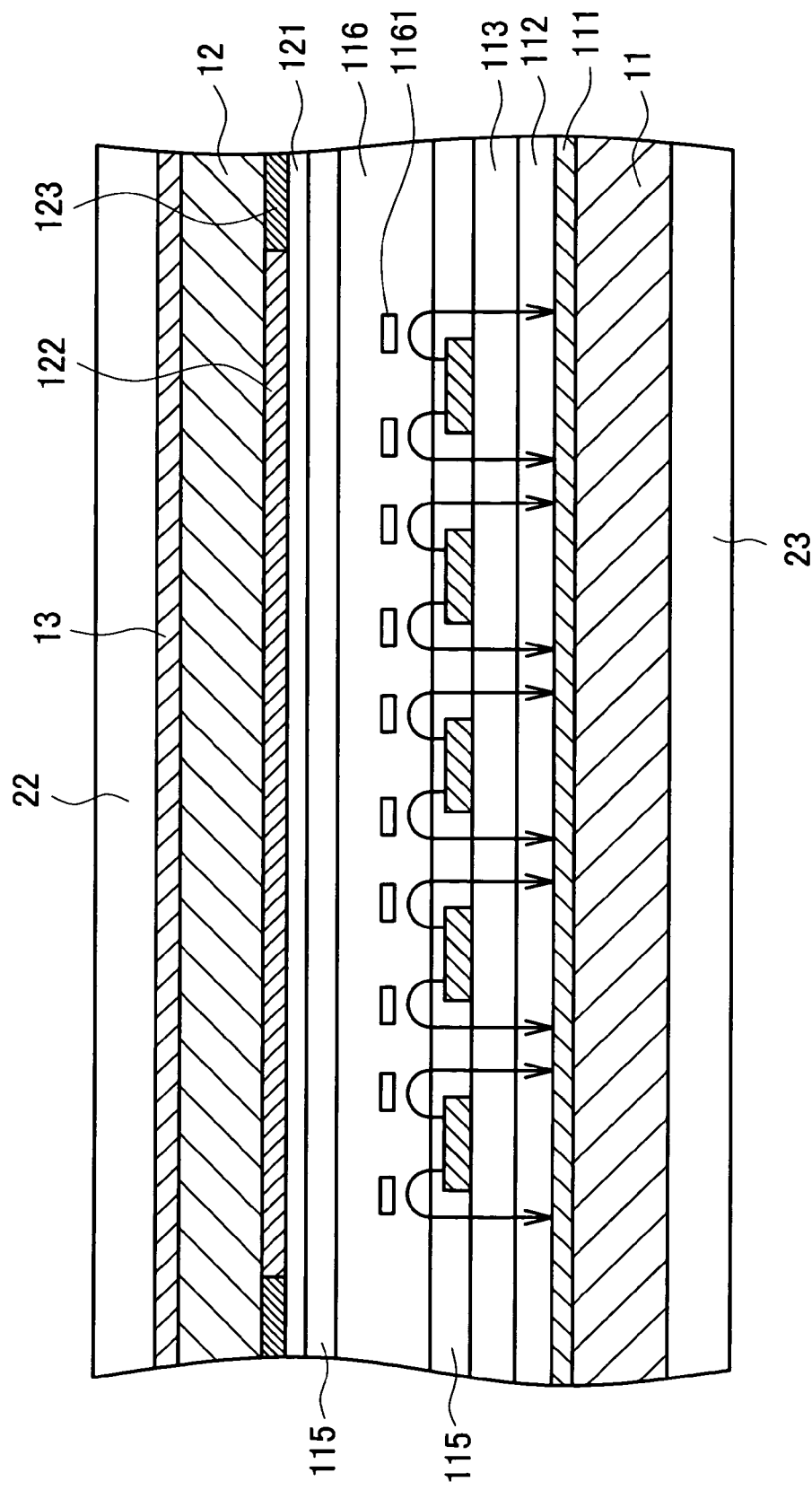
FIG. 21 is a cross-sectional view of an IPS-type liquid crystal display panel.

An In-Plane-Switching (hereinafter, referred to as IPS) liquid crystal display device forms an image by controlling a transmission light from a backlight for every pixel by rotating liquid crystal molecules in the direction parallel to the glass substrate, and exhibits an excellent viewing angle characteristic. FIG. 21 is a schematic cross-sectional view of one pixel portion in the IPS liquid crystal display panel.

In FIG. 21, a counter electrode 111 is formed on an inner side of the TFT substrate 11. The counter electrode 111 is formed of a transparent electrode, and is, in general, formed of an ITO film. A gate insulation film 112 for a thin film transistor (TFT) not shown in the drawing is formed on the counter electrode 111, and an inter-layer insulation film 113 is formed on the gate insulation film 112. Both of the gate insulation film 112 and the inter-layer insulation film 113 are, in general, formed of an SiN film. A comb-teeth-shaped pixel electrode 114 is formed on the inter-layer insulation film 113. An alignment film 115 for aligning liquid crystal molecules 1161 is formed in a state that the alignment film 115 covers the pixel electrode 114.

A liquid crystal layer 116 is sandwiched between the TFT substrate 11 and the color filter substrate 12. Color filters 122 for forming a color image are formed on the color filter substrate 12. A black matrix 123 is formed between the color filters 122 thus enhancing contrast of the image. An overcoat film 121 for leveling is formed on the color filters 122 and the black matrix 123 using a resin. An alignment film 115 is formed on the overcoat film 121, that is, on portions of the overcoat film 121 which are brought into contact with the alignment film 115.

In FIG. 21, a fixed voltage is applied to the counter electrode 111, while a voltage corresponding to a data signal is applied to the pixel electrode 114. Due to such application of voltages, an electric field indicated by lines of electric force shown in FIG. 21 is generated between the pixel electrode 114 and the counter electrode 111. Accordingly, an electric field in the lateral direction is applied to the liquid crystal molecules 1161 to rotate the liquid crystal molecules 1161 thus controlling the transmission of light from the backlight at the alignment film 115. An image is formed by controlling transmissivity of light from the backlight for every pixel.

As shown in FIG. 21, to apply the electric field corresponding to the data signal to the alignment film 115, the electrode on the color filter substrate 12 is not necessary and it is sufficient to provide only the electrodes formed on the TFT substrate 11. However, simply with such constitution, the liquid crystal display panel cannot sufficiently cope with electrical noises from the color filter substrate 12. To sufficiently cope with such noises, a transparent electrode made of ITO is, in general, formed on an outer side of the color filter substrate 12 and the transparent electrode is grounded thus isolating the inside of the liquid crystal display panel from the noises. Such constitution is disclosed in patent document 3. Then, a lower polarizer 23 is adhered to a lower side of the TFT substrate 11, while an upper polarizer 22 is adhered to transparent electrode on the TFT substrate 11.

In applying the present invention to the IPS liquid crystal display device, the transparent electrode for electrostatic shielding described above can be used as a heater for heating the liquid crystal display panel. To apply the present invention to the IPS liquid crystal display device, the electrode 14 which uniformly supplies an electric current to the transparent electrode arranged on the outer side of the color filter substrate 12 becomes necessary. The electrode 14 may be formed by directly applying the method explained in conjunction with the embodiments 1 to 5. It is needless to say that the present invention uses the transparent electrode on the color filter substrate 12 as the heater and hence, it is necessary to determine the resistance, a film thickness and the like of the transparent electrode based on the specification which conforms to the heater of the present invention.

As described above, the present invention is applicable to the IPS liquid crystal display device without largely changing steps of the manufacture of the liquid crystal display panel.

What is claimed is:

1. A liquid crystal display device comprising:
   a liquid crystal display panel which is constituted of a TFT substrate on which pixel electrodes and TFTs are formed;
   a color filter substrate on which color filters are formed; and
   liquid crystal sandwiched between the color filter substrate and the TFT substrate, wherein
   a transparent conductive film for heating the color filter substrate is formed on a front surface of the color filter substrate,
   first and second electrodes for supplying an electric current to a transparent conductive film are respectively formed on a first side of the color filter substrate and a second side of the color filter substrate which faces the first side in an opposed manner,
   a sheet resistance of the first and second electrodes is less than a sheet resistance of the transparent conductive film, and
   lead members for supplying an electric current to the first and second electrodes respectively from an external source are formed on the first and second electrodes respectively.

2. A liquid crystal display device according to claim 1, wherein the first and second electrodes are formed by Ni plating.

3. A liquid crystal display device according to claim 1, wherein a sheet resistance of the first and second electrodes is equal to or less than $1/1000$ of a sheet resistance of the transparent conductive film.

4. A liquid crystal display device according to claim 1, wherein the lead members are a conductive tape.

5. A liquid crystal display device according to claim 1, wherein the lead members are a flat cable and are connected to the first and second electrodes respectively via a solder.

6. A liquid crystal display device according to claim 1, wherein the lead members are formed on two sides of the color filter substrate.

7. A liquid crystal display device according to claim 1, wherein the lead members are formed on one side of the color filter substrate.

8. A liquid crystal display device comprising:
   a liquid crystal display panel which is constituted of a TFT substrate on which pixel electrodes and TFTs are formed;
   a color filter substrate on which color filters are formed; and
   liquid crystal sandwiched between the color filter substrate and the TFT substrate, wherein
   a flexible printed circuit board is connected to a front surface of the TFT substrate,
   a transparent conductive film for heating the color filter substrate is formed on a front surface of the color filter substrate,
   first and second electrodes for supplying an electric current to a transparent conductive film are respectively formed on a first side of the color filter substrate and a second side of the color filter substrate which faces the first side in an opposed manner,
   a sheet resistance of the first and second electrodes is less than a sheet resistance of the transparent conductive film,
   lead members for supplying an electric current to the first and second electrodes respectively from an external source are formed on the first and second electrodes respectively,
   the lead members extend over the front surface of the TFT substrate, and
   the first and second electrodes are connected with a line of the flexible printed circuit board.

9. A liquid crystal display device according to claim 8, wherein the lead members are a conductive tape.

10. A liquid crystal display device according to claim 8, wherein the lead members are mounted on one side of the color filter substrate, and both of the first and second electrodes are connected with the same flexible printed circuit board.

11. A liquid crystal display device according to claim 8, wherein the lead member which is respectively connected with the first electrode mounted and the lead member which is respectively connected with the second electrode mounted are connected with different flexible printed circuit boards.

12. A liquid crystal display device housing a liquid crystal display panel which is constituted of a TFT substrate on which pixel electrodes and TFTs are formed, a color filter substrate on which color filters are formed, and liquid crystal sandwiched between the color filter substrate and the TFT substrate in the inside of a metal-made upper frame, wherein
   a transparent conductive film for heating the color filter substrate is formed on a front surface of the color filter substrate,
   first and second electrodes for supplying an electric current to a transparent conductive film are respectively formed on a first side of the color filter substrate and a second side of the color filter substrate which faces the first side in an opposed manner,
   a sheet resistance of the first and second electrodes is less than a sheet resistance of the transparent conductive film,
   lead members for supplying an electric current to the first and second electrodes respectively from an external source are formed on the first and second electrodes respectively, and
   an insulation member is formed between the upper frame and one of the electrodes or the lead members.

13. A liquid crystal display device according to claim 12, wherein the insulation member is made of an organic resin.

14. A liquid crystal display device according to claim 12, wherein the insulation member is an insulation sheet.

* * * * *